D. B. Platt,
Grain Drill.
No. 78,998. Patented June 16, 1868.
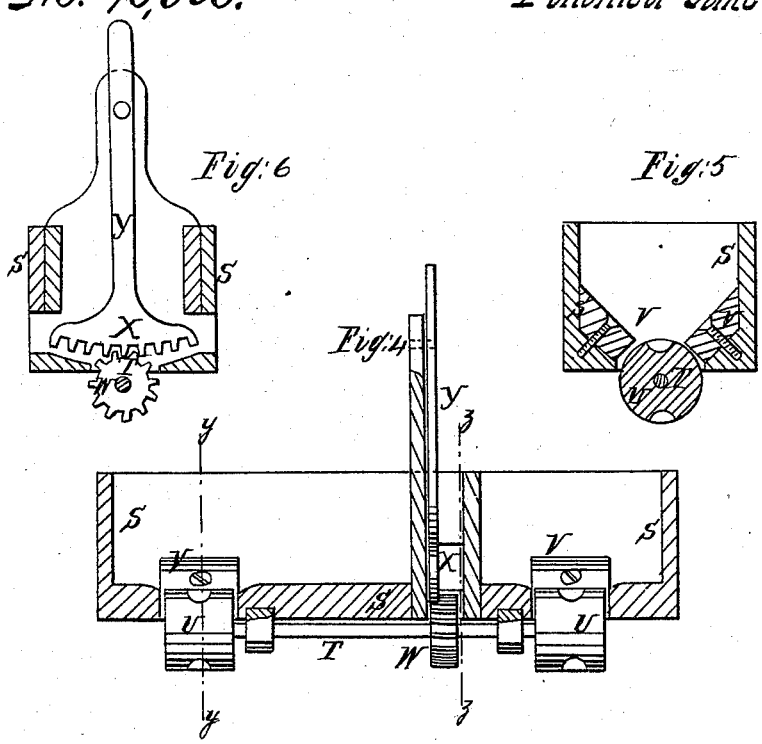
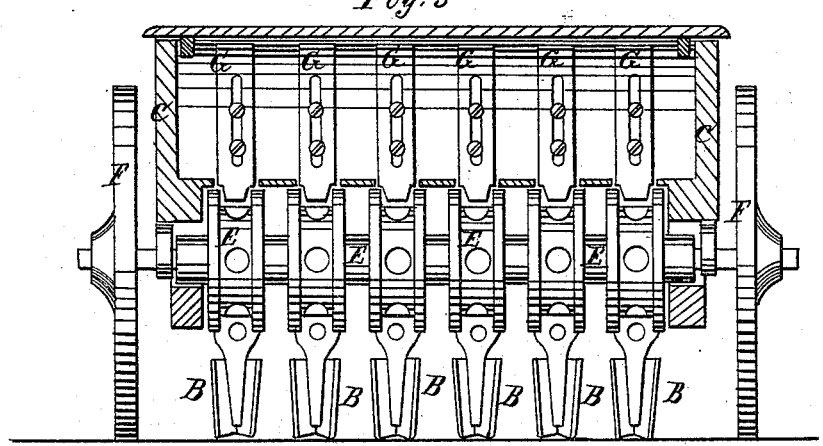
Witnesses
Theo Tusche
J. A. Fraser
Inventor
D B Platt
Per Munn &
Attorneys

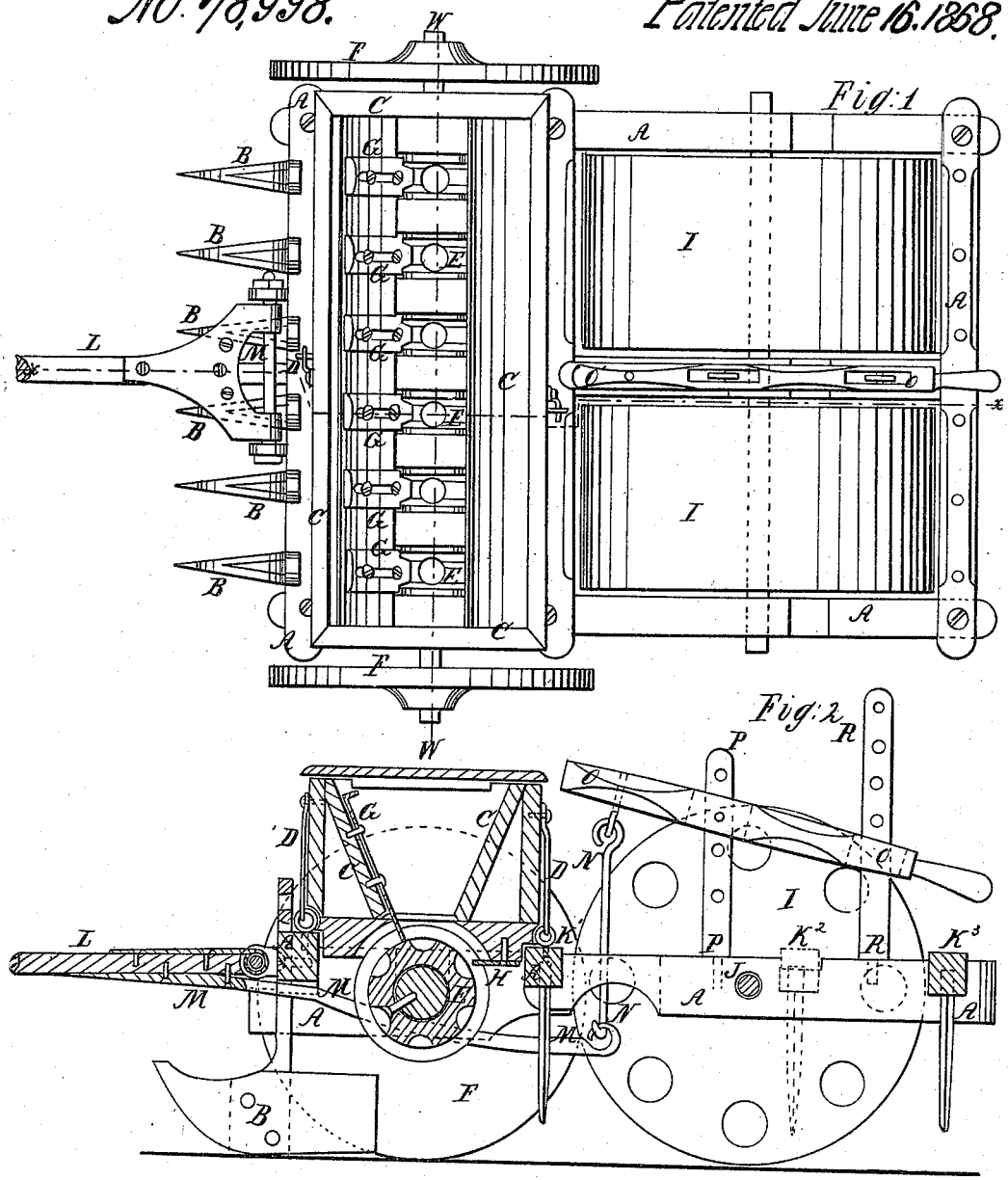

United States Patent Office.

DAVID B. PLATT, OF MADISON, INDIANA.

Letters Patent No. 78,998, dated June 16, 1868.

---

IMPROVEMENT IN COMBINED HARROW, DRILL, PLANTER, AND ROLLER.

---

*The Schedule referred to in these Letters Patent and making part of the same.*

---

TO ALL WHOM IT MAY CONCERN:

Be it known that I, DAVID B. PLATT, of Madison, in the county of Jefferson, and State of Indiana, have invented a new and improved Combined Harrow, Drill, Planter, and Roller; and I do hereby declare that the following is a full, clear, and exact description thereof, which will enable those skilled in the art to make and use the same, reference being had to the accompanying drawings, forming part of this specification, and in which—

Figure 1 is a top or plan view of my improved machine.

Figure 2 is a vertical longitudinal section of the same, taken through the line $x\ x$, fig. 1.

Figure 3 is a vertical cross-section of the same, taken through the line $w\ w$, fig. 1.

Figure 4 is a detail longitudinal sectional view of the seed-box and dropping-device for planting.

Figure 5 is a detail cross-section of the same, taken through the line $y\ y$, fig. 4.

Figure 6 is a detail cross-section of the same, taken through the line $z\ z$, fig. 4.

Similar letters of reference indicate corresponding parts.

My invention has for its object to furnish an improved combined harrow, drill, planter, and roller, so constructed and arranged that the drill and roller or planter and roller may be used together, or the roller and harrow may each be used alone, as may be desired, according to the particular work to be done.

And it consists in the construction, combination, and arrangement of the various parts of the machine, as will be hereinafter more fully described.

A is the frame of the machine, to the forward cross-bar of which the plows or markers B are attached, by which the ground is opened to receive the seed.

The rear parts of the plows or markers B are divided, as shown in fig. 3, so that the seed may be introduced into the bottom of the marks or furrows opened by the plows, and be covered by the inflow of the soil in the rear of the said plows.

The standards of the plows B are adjustably secured to the said cross-bar, so that they may be set higher or lower, as may be desired.

C is the drill seed-box, which rests upon the frame A, and is removably secured in place by the hooks D.

E is the dropping-shaft, which revolves in bearings attached to the seed-box C, and which receives motion from the wheels F, attached to its ends, and which roll along the ground.

The shaft E is grooved, or has grooved wheels attached to it, as shown in figs. 1, 2, and 3, and in the bottoms of said grooves are formed holes or recesses, to receive the seed and carry it out of the seed-box, said recesses being of such a size as to hold the quantity of grain required to be dropped at each time.

G are adjustable gauges, attached to the front side of the box C, to regulate the escape of the seed. H are stationary plates or tongues, attached to the rear side or bottom of the box C to prevent the rearward escape of the seed through the grooves of the shaft E.

I is the roller, which is made in two parts, as shown in fig. 1, and is removably pivoted to the frame A by the rod J, which passes longitudinally through the centres of said rollers, and through the longitudinal bars of the frame A.

$K^1\ K^2\ K^3$ are cross-bars, secured to the frame A, and having long downwardly-projecting teeth attached to them. The bars $K^1\ K^3$ may be permanently attached to the frame A, but the bar $K^2$ can only be used when the roller I is removed.

L is the tongue, which is pivoted to the middle part of the front cross-bar of the frame A.

M is a bar or arm, the forward end of which is rigidly attached to the tongue L, and which passes back beneath the shaft E, and to its rear end is pivoted the lower end of the connecting-rod N, which passes up through a slot in the central longitudinal bar of the frame A, and its upper end is pivoted to the forward end of the lever O.

The lever O is pivoted to the standard P by a pin, passing through the said lever, and through one or the other of the several holes formed through the said standard, so that the said lever may be raised or lowered, as desired.

When the forward end of the tongue L is fast in the neck-yoke of the horses, by lowering the rear end of the lever O, the forward end of the frame A will be raised, raising the plows B away from the ground, and by operating the said lever O, the plows or markers B may be adjusted to run at any desired depth in the ground.

The rear end of the lever O is secured in place when adjusted by a pin, passing through the said lever, and through one or the other of the several holes formed in the standard R for its reception.

S is the planter seed-box, which when in use, is secured to the forward part of the frame A by hooks, in the same manner and in the same place as the drill seed-box C.

T is a shaft, which works in bearings attached to the bottom of the box S.

To the ends of the shaft T are attached the dropping-cylinders U, which communicate with the interior of the seed-box S through slots formed in the bottom of said box, and which have holes or recesses formed in their opposite sides, to receive the seed from the box S, and drop it to the ground.

V are rubber or other elastic plates or scrapers, attached to the bottom of the seed-box to prevent any more than the desired quantity of seed from passing out.

To the shaft T is attached a small gear or pinion-wheel, W, into the teeth of which mesh the teeth of the curved rack or segment X, formed upon or attached to the lower end of the lever Y.

The lever Y passes up through a small compartment formed in the middle part of the seed-box S, is pivoted to the upwardly-projecting part of one of the partitions that form the said compartment, and its upper end projects sufficiently to allow it to be grasped and conveniently operated by the driver to drop the seed.

By removing the seed-box and rollers, and securing the toothed bar $K^2$ in place, as shown in red in fig. 2, the machine becomes simply a harrow. By removing the toothed bar $K^2$, and attaching the rollers I, the machine becomes simply a roller. By attaching the drill seed-box C to the frame A, the machine becomes a combined drill and roller; and by removing the drill seed-box C, and attaching the planter seed-box S, the machine becomes a combined planter and roller.

These adjustments are all easily and quickly made, making the machine very convenient and effective for farmers' use.

I claim as new, and desire to secure by Letters Patent—

1. The combination of the rollers I with the removable seed-box C, drill-shaft E, wheels F, adjustable plows B, and frame A, all constructed, arranged, and operating substantially as described.

2. The combination of the removable seed-box S, shaft T, planting-rollers U, pinion W, toothed rack S, and lever Y, with the adjustable plows B and frame A, all constructed, arranged, and operating substantially as set forth.

3. The combination of the pivoted tongue L, bar M, connecting-rod N, pivoted lever O, perforated standards P R, and frame A, substantially as described, and for the purpose specified.

4. The combination of the slides G, plates H, removable seed-box C, roller E, and wheels F, substantially as described.

5. The frame K, when its front and rear cross-bars, $K^1$ $K^3$, are provided with teeth, in combination with the removable toothed cross-bar $K^2$, substantially as set forth.

DAVID B. PLATT.

Witnesses:
 ALBERT PLATT,
 T. J. HUMPHREYS.